United States Patent
Hunt

(10) Patent No.: US 7,281,545 B2
(45) Date of Patent: Oct. 16, 2007

(54) HEIGHT AND ACCESSORY ADAPTABLE METER SETTER

(75) Inventor: Mitchell Hunt, Murfreesboro, TN (US)

(73) Assignee: Mueller International, Inc., Portsmouth, NH (US)

( * ) Notice: Subject to any disclaimer, the term of this patent is extended or adjusted under 35 U.S.C. 154(b) by 309 days.

(21) Appl. No.: 11/149,060

(22) Filed: Jun. 8, 2005

(65) Prior Publication Data

US 2006/0278273 A1    Dec. 14, 2006

(51) Int. Cl.
*G01F 15/18* (2006.01)
(52) U.S. Cl. .................................... 137/315.06; 73/201
(58) Field of Classification Search ........... 137/315.06, 137/615; 73/201, 273
See application file for complete search history.

(56) References Cited

U.S. PATENT DOCUMENTS 3,935,736 A * 2/1976 Enright ...................... 73/201
4,691,727 A * 9/1987 Zorb et al. ............. 137/315.06
5,145,214 A * 9/1992 Hunt ........................... 73/201

* cited by examiner

Primary Examiner—Kevin Lee

(57) ABSTRACT

A unitary water meter setter, preferably provided in an integral brass casting, has a continuous inlet pipe having an inwardly extending inlet service leg with a threaded end, and an inlet meter support leg extending upwardly with respect thereto to a threaded meter inlet end and a continuous outlet pipe having an inwardly extending outlet service leg aligned with the inlet service leg with a threaded end and an outlet meter support leg extending upwardly with respect thereto to a threaded meter outlet end. A central bracing structure rigidly connects spaces and positions the inlet and outlet pipes to receive a water meter and connecting components. The connecting components include a first set of two riser pipes each providing substantially the same rise, one of the riser pipes threadably connected at one end to the threaded meter inlet end of the inlet pipe, and the other riser pipe connected at one end to the meter outlet end of the outlet pipe. The other ends of the two riser pipes are thereby positioned to receive a water meter and connecting components associated therewith. Multiple sets of riser pipes may be used.

20 Claims, 4 Drawing Sheets

HEIGHT AND ACCESSORY ADAPTABLE METER SETTER

FIELD OF THE INVENTION

The invention herein relates to a meter setter that provides for installation of a water meter at a selected height and for attaching and/or retrofitting components.

BACKGROUND OF THE INVENTION

A water meter is installed between a water main and a customer building to measure the customer's water use. A water company service line extends between the water main and a meter box, where it terminates. A customer service line extends between the meter box and the customer's building.

A meter setter is used to install the water meter in the meter box. The meter setter connects with the water company service line and with the customer service line, and provides for mounting the water meter approximately 12 inches below ground level and a meter box cover at ground level.

The water company service line and the customer service line are installed a substantial distance below the surface of the ground, to prevent accidental damage from digging and, in colder climates, to prevent winter freezes. The depth is different for different climate areas.

A typical prior art meter setter 100 is shown in FIG. 7. It has a brass base casting 102 with a first elbow 104 and a second elbow 106 separated by integrally cast bracing 108. The first elbow 104 has a coupling 110 for connecting with the water company service line, and the second elbow 106 has a coupling 112 for connecting with the customer service line.

A shaped copper pipe 114 has one of its ends soldered to the upper end of elbow 104, at 116. A mirror image shaped copper pipe 118 is soldered to the upper end of elbow 106 at 120.

The other end of copper pipe 114 is provided with a threaded terminal fitting 122, which is soldered to the copper pipe 114 at 124. Similarly, the copper pipe 118 is provided with a threaded terminal fitting 126, which is soldered to the copper pipe 118 at 128. The copper pipes 114 and 118 are shaped such that their terminal fittings 122 and 126 are spaced apart for receiving a water meter and its accessory connecting components. In FIG. 7, the accessory connecting components include a right angle ball valve 130 that is threadably coupled onto the terminal end fitting 122 and itself provides a fitting for receiving one side of a water meter (not shown in FIG. 7). The pipe 118 is provided with a check valve 132, threadably coupled onto terminal fitting 126 for receiving the other end of the water meter.

The meter setter 100 shown in FIG. 7 provides a fixed height FH between the center lines of fittings 110, 112 on the elbows 104, 106 and the center lines of ball valve 130 and check valve 132 installed on fittings 122, 126 soldered to the copper pipes 114, 118. Therefore, the meter setter 100 is adapted to support a water meter at a given fixed height above the water company service line and customer service line. Meter setters 100 are fabricated to provide different heights FH by providing the pipes 114, 118 in different lengths. However, because these pipes are soldered to the base 102 as a part of the manufacturing process, the meter setters must be provided in a variety of fixed heights. Each fixed height must be individually manufactured, shipped and inventoried, and the proper fixed height must be selected and transported to a job site for installing a meter. Generally, typical fixed height meter setters for the climate area may be carried on service trucks, but the height cannot be adjusted if an unanticipated height is required, such as when a customer has regraded the ground level after the service pipes are in place.

The prior art meter setter 100 has an additional drawback in that the terminal fittings 122 and 126 are soldered to the copper pipes 114 and 118, and the solder joints have limited torque strength. Therefore, when it is necessary to replace one or both of the components 130, 132, which is sometimes necessary to replace a water meter or to provide a check valve or the like, it is quite easy to damage the meter setter and then require replacement of the entire assembly. The solder joints, and especially those connecting the base and spreader pipes, can also be cracked or damaged by impacts or loads on the copper pipes. The prior art meter setters are easily damaged in shipment and storage, as the copper pipes can be bent and/or misaligned.

For the foregoing reasons, the prior art meter setters have certain drawbacks and an improved water meter setter would be a welcome advance in the art. This art has been stagnant for many years. The foregoing problems have existed, but have not been recognized, addressed or solved.

SUMMARY OF INVENTION

It is a principal object of the invention herein to provide an improved meter setter.

It is a further object of the invention herein to provide a meter setter that is adaptable to supporting water meters at selected heights.

It is an additional object of the invention herein to provide a meter setter that accepts a variety of connecting components, including retro-fitting connecting components after initial installation.

It is another object of the invention herein to provide a meter setter that reduces inventory requirements.

It is also an object of the invention herein to provide a meter setter that is rugged and resists damage in shipping and handling, including at the job site and during installation.

It is a still further object of the invention herein to provide a meter setter that has a long service life.

In carrying out the foregoing objects of the invention, a meter setter is provided in a unitary metal structure including a continuous inlet pipe having an inwardly extending horizontal inlet service leg with a threaded inlet service end and an inlet meter support leg extending perpendicularly upwardly with respect to the inlet service leg, the inlet meter support leg having a vertically disposed threaded meter inlet end. Also part of the unitary metal structure is a continuous outlet pipe having an inwardly extending outlet service leg with a threaded outlet service end and an outlet meter support leg extending perpendicularly upwardly with respect to the outlet leg, the outlet support leg having a vertically disposed threaded meter outlet end. The unitary metal structure further includes a central bracing structure extending between the inlet pipe and outlet pipe, the central bracing structure rigidly spacing and positioning the inlet and outlet pipes such that the inlet service leg and the outlet service leg are positioned for connection to the water company and customer service lines, and the inlet meter support leg and outlet meter support leg are positioned to receive a water meter and connecting components associated with the water meter.

The unitary metal structure is preferably an integral metal casting, which is preferably brass.

According to more aspects of the invention, the continuous inlet pipe has an inlet vertical leg extending upwardly from the inlet service leg, an inlet spreader leg extending outwardly and upwardly from the inlet vertical leg, with the inlet meter support leg extending upwardly from the inlet spreader leg to its threaded meter inlet end. Similarly, the continuous outlet pipe has an outlet vertical leg extending upwardly from its outlet service leg, and positioned substantially parallel to and spaced from the inlet vertical leg of the continuous inlet pipe. The continuous outlet pipe also has an outlet spreader leg extending outwardly and upwardly from the inlet vertical leg, with its outer meter support leg extending upwardly to its threaded meter outlet end.

According to further aspects of the invention, the central bracing structure preferably includes at least two and preferably three horizontal spaced-apart ribs joining the inlet and outlet vertical legs and the inlet and outlet spreader legs at points adjacent to the vertical legs, and at least one centrally positioned vertical rib joining the horizontal ribs. The water meter setter is preferably symmetrical, wherein the designations of one continuous pipe as the inlet pipe and the other continuous pipe as the outlet pipe are derived with reference to the connection of the water meter setter between a water company service line and customer service line, and the meter setter may be used in reversible orientation.

In additional aspects of the invention, the connecting components include at least one set of two riser pipes adapted for connection to the threaded ends of the inlet and outlet meter support legs, respectively, with the riser pipes having threaded ends opposite the inlet and outlet meter support legs, wherein a water meter may be connected to the input and outlet support legs at a greater height above the inlet and outlet service legs. Sets of riser pipes are provided in a selection of lengths, and sets of riser pipes may be used individually and in combination to achieve a desired height of the water meter. According to a particular aspect of the invention, the meter setter provides a seven inch height, and sets of riser pipes provide an additional two inch and five inch rise in height, or additional rises in height when used in combination.

Also according to aspects of the invention herein, the connecting components include a first right angle fitting, preferably a ball valve, connecting the meter inlet support leg of the continuous inlet pipe with a water meter, and a second right angle fitting, preferably a check valve, connecting the outlet of the water meter to the meter outlet support leg of the continuous outlet pipe.

The foregoing and other objects and features of the invention herein will, in part, be readily understood by those skilled in the art and will, in part, appear in the following description of the preferred embodiments and claims, taken together with the drawings.

BRIEF DESCRIPTION OF DRAWINGS

The same reference numerals refer to the same elements throughout the various Figures.

DESCRIPTION OF PREFERRED EMBODIMENTS

The following is a description of a preferred embodiment of a meter setter according to the invention. It is intended to be illustrative of how the invention can be practiced, but not limiting as to full scope of the invention.

Figure 1:
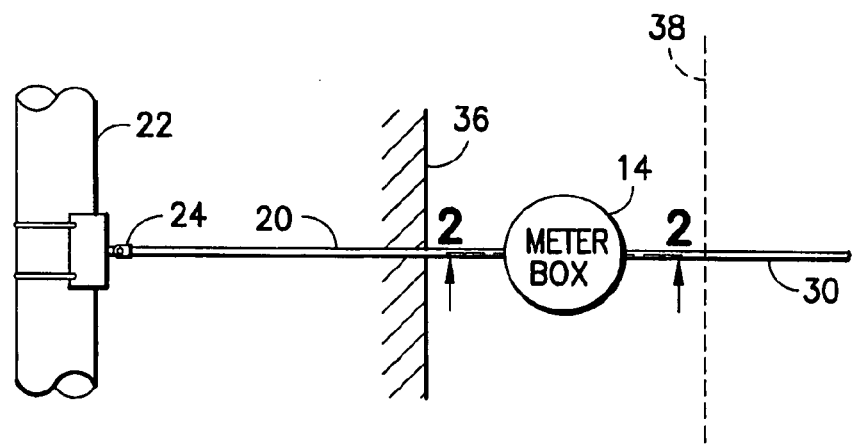
FIG. 1 is a schematic view of a water meter installation.
Figure 2:
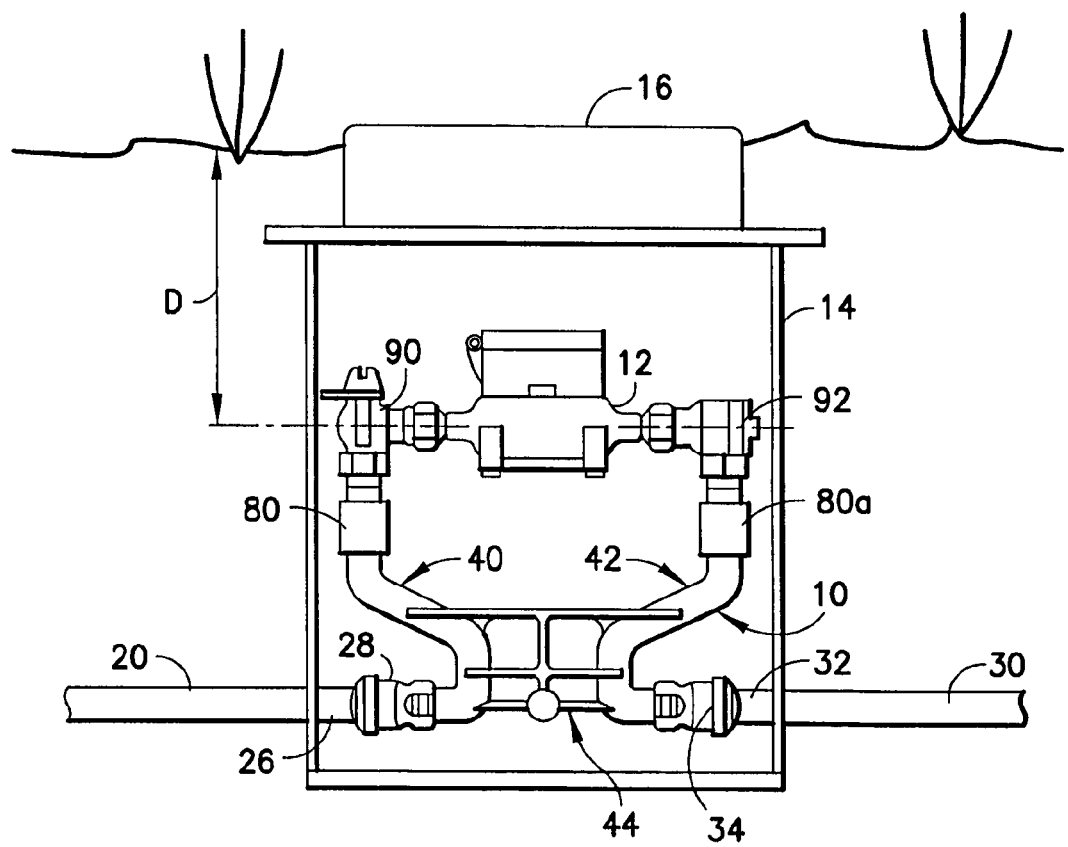
FIG. 2 is a side elevation view of a meter setter according to the invention herein in the water meter installation of FIG. 1, taken generally along the lines 2-2 of FIG. 1.

With reference to FIGS. 1 and 2, a water meter installation site is shown, including a meter setter 10 according to the invention herein. The water meter setter 10, together with a water meter 12 and associated connecting components to be described below, are housed in a meter box 14 having a cover 16. A water company service pipe 20 is attached to a water main 22 at a valve 24, and the distal end 26 of the water company service pipe 20 extends into the meter box 14, and is provided with a threaded end coupler 28. A customer service pipe 30 has its distal end 32 extending into the meter box 14, aligned with and spaced from the distal end 26 of the water company service pipe 20. The distal end 32 of the customer service pipe 30 is provided with a threaded end coupler 34. The water main 22 is typically located under a road having a curb 36, and the meter box 14 is typically located between the curb 36 and an easement boundary 38 on the customer's property.

Figure 3:
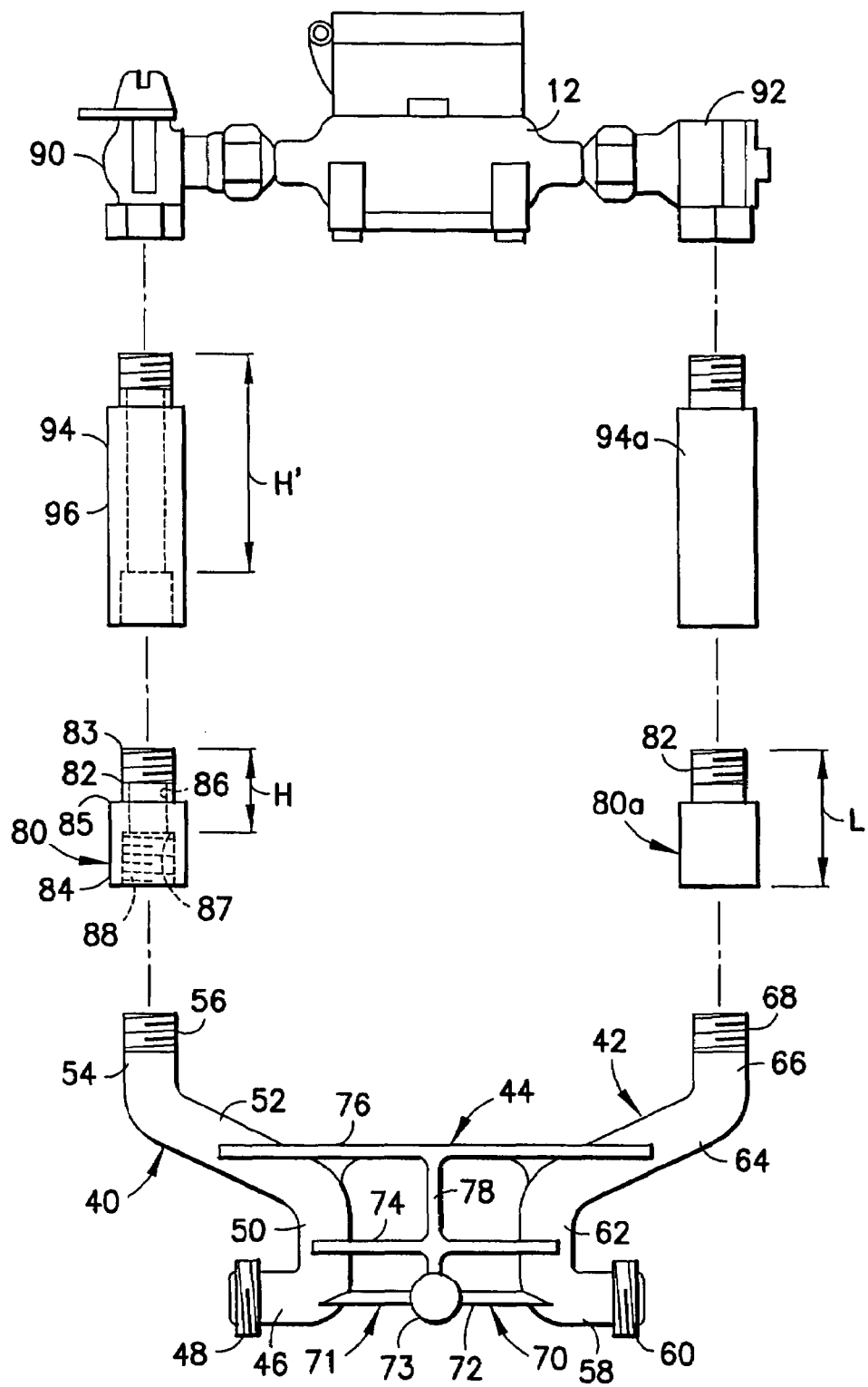
FIG. 3 is an exploded perspective view of the meter setter and water meter of FIG. 2 and water meter connecting components associated therewith.
Figure 4:
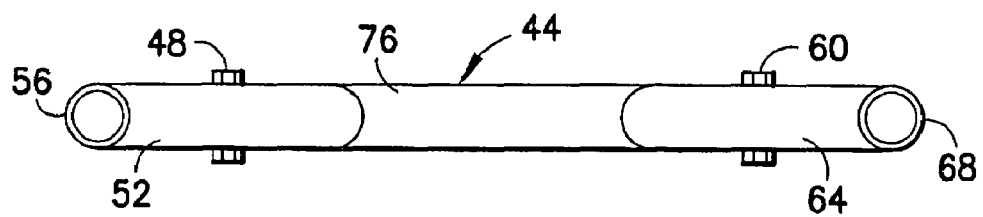
FIG. 4 is a top view of the meter setter of FIGS. 2 and 3.

With reference to FIGS. 2-4, the meter setter 10 is an integral metal casting including a continuous inlet pipe 40, a continuous outlet pipe 42 and a central bracing structure 44 that rigidly connects and spaces the inlet pipe 40 and outlet pipe 42. As used herein to describe the meter setter 10, the term "horizontal" refers to the orientation of the aligned water company service pipe 20 and customer service pipe 30, and the term "vertical" refers to the upward orientation from the aligned water company service pipe and customer service pipe. The term "inward" means toward the central bracing 44 of the meter setter 10, and the term "outward" means away from the central bracing 44.

The continuous inlet pipe 40 has an inwardly extending horizontal inlet service leg 46, which has an exteriorly threaded inlet service end 48 for receiving the end coupler 28 of the water company service pipe 20. The inlet service leg 46 transitions to an inlet vertical leg 50 extending upwardly from the inlet service leg, and the inlet vertical leg 50 transitions to an inlet spreader leg 52 extending outwardly and upwardly from the inlet vertical leg 50. The inlet spreader leg 52 transitions to an inlet meter support leg 54 extending upwardly from the inlet spreader leg, the inlet meter support leg being vertical or perpendicular with respect to the horizontal inlet service leg 46. The inlet meter support leg 54 has an exteriorly threaded meter inlet end 56. The threaded meter inlet end 56 is adapted to receive the connecting components associated with and mounting the water meter 12.

The continuous outlet pipe 42 has an inwardly extending horizontal outlet service leg 58, which is substantially aligned with the inlet service leg 46 of the inlet pipe 40. The outlet service leg 58 has an exteriorly threaded outlet service end 60, which threadably receives the coupler 34 at the distal end 32 of the customer service pipe 30.

The outlet service leg 58 transitions to an outlet vertical leg 62, which is substantially parallel to and spaced apart from the inlet vertical leg 50 of the inlet pipe 40. The outlet vertical leg 62 transitions to an outlet spreader leg 64 extending outwardly and upwardly from the outlet vertical leg 62. The outlet spreader leg 64 transitions to a outlet meter support leg 66, which has an exteriorly threaded meter outlet end 68.

The inlet pipe 40 and the outlet pipe 42 are connected by an integral central bracing structure 44, which in the preferred embodiment consists of a horizontal bottom rib 70 extending between the transitions from the horizontal inlet and outlet service legs 46, 58 to the vertical legs 50, 62, a horizontal middle rib 74 extending between the inlet and outlet vertical legs 50, 62, and a horizontal top rib 76 extending between the inlet and outlet spreader legs 52, 64. The horizontal bottom rib 70 is provided in two portions 71, 72 with a stabilizing ring 73 at the center of the rib 70.

A vertical rib 78 connects the ring 73, the horizontal middle rib 74 and the horizontal top rib 76.

It will be seen that the central bracing structure 44 connects the inlet pipe 40 and the outlet pipe 42 in a mirror image configuration, wherein the inlet and outlet legs 46, 58 are aligned and the inlet meter support leg 54 and the outlet meter support leg 66 are parallel and end at the same height above the inlet legs 46, 58, thereby adapting the meter setter 10 to mount the water meter 12 by means of connecting components associated therewith. It should also be noted that because the meter setter 10 has inlet pipe 40 and outlet pipe 42 in a mirror image configuration, the actual connection of the pipes to the service lines may be reversed and the terms "inlet" and "outlet" have been applied to the pipes 40, 42 to reflect their connections in the installation shown.

Figure 5:
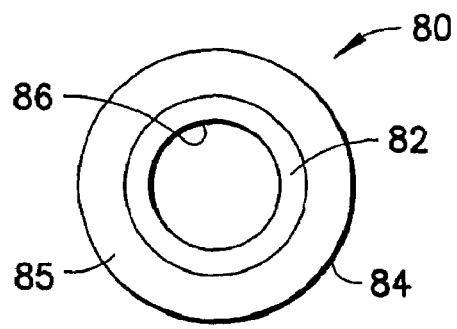
FIG. 5 is a top view of a riser pipe connecting component shown in FIG. 3.
Figure 6:
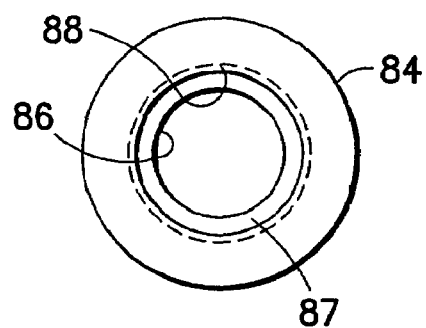
FIG. 6 is a bottom view of a riser pipe connecting component shown in FIG. 3.
Figure 7:
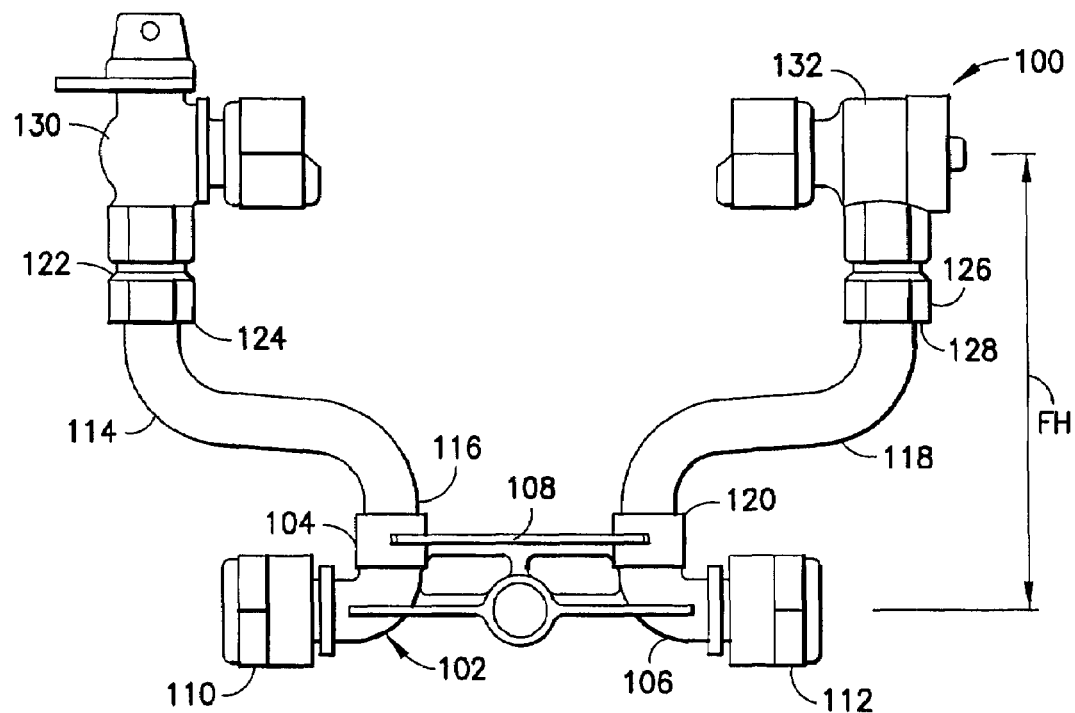
FIG. 7 is a side elevation view of a prior art meter setter and connecting components associated therewith.

With reference to FIG. 2, the connecting components include a set of riser pipes 80 and 80a, riser pipes 80, 80a also being shown in FIG. 3 and riser pipe 80 being shown in FIGS. 5 and 6. Riser pipes 80, 80a are preferably identical and therefore interchangeable, and aspects described and reference numerals applied to one of them are also applicable to the other.

Riser pipe 80 has a stem 82 with exterior threads 83, and a larger diameter body 84. A shoulder 85 is defined at the transition between the stem 82 and the body 84. With reference to FIG. 3, the stem 82 and upper portion of the body 84 define a bore 86 terminating at a seat 87. Below the seat 87, the base 84 has interior threads 88 for receiving the exteriorly threaded meter inlet end 56 of the inlet meter support leg 54. The top view of the riser pipe 80 shown in FIG. 5 shows the stem 82, the bore 86, and the shoulder 85 transitioning between the stem 82 and the body 84. The bottom view of riser pipe 80 shown in FIG. 6 illustrates the body 84, the threads 88, the seat 87 and the bore 86.

The risers 80, 81 have an overall length "L" of three inches, and have an effective "rise" or height increase "H" of two inches, as seen in FIG. 3. The effective height increase "H" is the distance from the seat 87 to the distal end of stem 82, and is achieved by the threaded meter inlet end 56 of the inlet supply leg 54 seating against seat 87 when the riser pipe 80 is installed thereon.

The purpose of the riser pipes 80, 80a is to extend the meter support legs 54, 56 so that the water meter 12 is at the proper height in the meter box 14. With reference to FIG. 2, the riser pipes 80, 80a establish the water meter at a depth "D" of approximately 12 inches below the ground surrounding the cover 16.

The connecting components further include a first right angle fitting in the form of a ball valve 90, which is installed on the threaded stem 82 of the riser pipe 80.

The ball valve 90 provides for shutting off water service at the meter box, in case there is a leak or some other service to the customer site is required. The connecting components also include a second right angle fitting in the form of a check valve 92 installed on the threaded stem 82 of riser pipe 80a. The check valve 92 is provided to prevent any back flow from the customer's building into the main water system, which is a requirement of many recent codes and regulations. Before such codes and regulations, a simple right angle fitting was often provided at the location of the check valve 92, and such fittings are still used where code permits. However, it is likely that the requirement of a check valve will become more universal, such that it will be necessary to replace any right angle fittings with check valves at some point in the future.

Both the ball valve 90 and the check valve 92 provide a right angle turn in the water path, and the water meter 12 is installed between them. Thus, they are "right angle fittings." It will be appreciated that other right angle fittings may be used, and that right angle fittings may be provided with the water meter.

With reference to FIG. 3, additional elevation of the water meter 12 may be provided by riser pipes 94, 94a which are also the same and interchangeable. The structure of the riser pipes 94, 94a is similar to the riser pipes 80, 80a, except that the bodies 96 of riser pipes 94, 94a are longer, and the overall length of riser pipes 94, 94a is six inches providing an effective height increase or rise H' of five inches. It will be appreciated that the first set of riser pipes 80, 80a, and the second set of riser pipes 94, 94a may be used in combination or individually. If riser pipes 80, 80a are used alone, an increase in rise of two inches is provided. If riser pipes 94, 94a are used alone, an increase in rise of five inches is provided, and if the riser pipes 80, 80a and riser pipes 94, 94a are used together, an effective increase in rise of seven inches is provided. It will further be understood that additional sets of riser pipes may be used in various combinations to provide whatever rise is required to place the meter at its desired position.

The meter setter 10 may also be used without any riser pipes. The ball valve 90 and the check valve 92 may be mounted directly to the inlet meter support leg 54 and outlet meter support leg 66 of meter setter 10. This provides a seven inch rise from the center of inlet leg 46 and outlet leg 58 to horizontal axis 96 through the ball valve 90 and check valve 92. The is one of the standard rises of the prior art meter setters. Another standard rise of prior art meter setters is nine inches, achieved in the preferred embodiment by adding riser pipes 80, 80a to the meter setter 10. A further standard rise is twelve inches, and adding riser pipes 94, 94a to the meter setter 10 provides that standard rise. These rises provided by the riser pipes described above are preferred because they match standard rises used in the trade, but it will be appreciated that riser pipes of different lengths may be provided as desired, and that non-standard rises that better fit the installation can also be provided. For example, two sets of riser pipes 80, 80a can provide a four inch rise instead of the five inch rise of riser pipes 94, 94a, if this results in an optimum meter height.

The meter setter 10 and riser pipe 80, 80a, 94, 94a are cast of 85-5-5-5 brass, also known at "Waterworks" brass. This material is approved by the American Water Works Association and is therefore preferred; however, other materials may be used for the castings, especially if other materials are approved in the future.

The meter setter 10 has numerous advantages over the prior art. At the point of manufacture, only one size of meter setter 10 is fabricated, and there is no need to manufacture meter setters of differing heights by forming and soldering copper tubes of different heights to a base. This advantage continues throughout the supply chain. Manufacturers may make inventory only one size meter setter and a variety of riser pipes. Distributors can order and stock only one size meter setter, plus the riser pipes most appropriate to the geographic area and climate they supply. Service trucks can carry only one size meter setter which may be preassembled with the most commonly used riser pipes and, together with a supply of riser pipes, be prepared to provide the proper custom installation height of any customer site. For instance, if the customer has regraded his soil to a higher ground level, a riser pipe can be quickly and easily added. The meter setter 10 and its riser pipes also provide a more compact volume for shipping and storage.

The meter setter 10 and the associated riser pipes also provide a stronger structure than the prior art meter setters with base and soldered copper pipes. When utilizing the meter setter 10 and riser pipes described herein, there are no solder joints that may be damaged during shipping and handling, and there are no solder joints that may crack or separate when torque is applied to the end fittings during installation and service. For instance, if it is necessary to install a check valve in place of a right angle fitting, appropriate torque may be applied to remove the old fitting and install the new one without possibility of damaging the meter setter.

The meter setter 10 described and the associated connecting components described herein are the preferred embodiment for carrying out the invention; however, it will be appreciated that certain changes and modifications may be made. For instance, and not by way of limitation, the center structure may be welded or brazed to the inlet pipe and outlet pipe to form a unitary meter setter, although integral casting is more efficient. The riser pipes are also preferably cast, but may be rolled pipe with machined threads if desired and permitted by local code. The center bracing structure is shown and described as having three horizontal ribs, a vertical rib and a stabilizer ring; however, numerous other configurations are permissible so long as they rigidly connect and properly space the inlet pipe and the outlet pipe. Diagonal bracing falls within such permissible changes and modifications. Also, the configuration of the inlet pipe and outlet pipe may be altered, although it is desirable that the locations of the threaded ends be maintained so that meter setters according to the invention are functional in existing installations, in combination with the spacings and structures commonly found within meter boxes.

Accordingly, a meter setter and riser pipes have been described which admirably achieves the objects of the invention herein. It will be understood by those skilled in the art that various additional changes and modifications may be made without departing from the spirit and scope of the invention, which is limited only by the following claims.

I claim:

1. A water meter setter comprising an integral metal casting including:
   A) a continuous inlet pipe having an inwardly extending inlet service leg with a threaded inlet service end, an inlet vertical leg extending upwardly from the inlet service leg, an inlet spreader leg extending outwardly and upwardly from the inlet vertical leg, and an inlet meter support leg extending upwardly from the inlet spreader leg to a threaded meter inlet end;
   B) a continuous outlet pipe having an inwardly extending outlet service leg substantially aligned with the inlet service leg of the inlet pipe and having a threaded outlet service end, an outlet vertical leg extending upwardly from the outlet service leg and positioned substantially parallel to and spaced from the inlet vertical leg of the inlet pipe, an outlet spreader leg extending outwardly and upwardly from the outlet vertical leg, and an outlet meter support leg extending upwardly from the outlet spreader leg to a threaded meter outlet end; and
   C) a central bracing structure extending between the inlet pipe and the outlet pipe and rigidly connecting, spacing and positioning the inlet pipe and outlet pipe such that the meter inlet end of the inlet pipe and the meter outlet end of the outlet pipe are positioned to receive a water meter and connecting components associated there with for mounting the water meter on the meter setter.

2. A water meter setter as defined in claim 1 wherein the connecting components include first and second right angle fittings each having threaded couplers for respectively connecting the right angle fittings to the threaded meter inlet end of the inlet pipe and to the threaded meter outlet end of the outlet pipe, the right angle fittings supporting the water meter therebetween.

3. A water meter setting as defined in claim 2 wherein the right angle fitting connected to the threaded meter inlet end of the inlet pipe is a valve.

4. A water meter setter as defined in claim 2 wherein the right angle fitting connected to the threaded meter outlet end of the outlet pipe is a check valve.

5. A water meter setter as defined in claim 2 wherein the connecting components include a first set of two riser pipes each providing substantially the same rise, one of the riser pipes threadably connected at one end to the threaded meter inlet end of the inlet pipe and at the other end to the first right angle fittings, and the other riser pipe connected at one end to the meter outlet end of the outlet pipe and at the other end to the second right angle fitting.

6. A water meter setter as defined in claim 5 wherein the meter inlet end of the inlet pipe and the meter outlet end of the outlet pipe have exterior threads and the riser pipes each have interior threads at one end thereof for connecting the riser pipe to the meter setter and the riser pipes each have exterior threads at the other end for threadably receiving additional connecting components.

7. A water meter setter as defined in claim 6 and further comprising a plurality of sets of two riser pipes, the riser pipes each having interior threads at one end thereof and exterior threads at the other end thereof, the sets of riser pipes respectively sequentially connected to the threaded meter inlet end of the inlet pipe and to the threaded meter outlet end of the outlet pipe.

8. A water meter setter as defined in claim 1 wherein the connecting components include a first set of two riser pipes each providing substantially the same rise, one of the riser pipes threadably connected at one end to the threaded meter inlet end of the inlet pipe, and the other riser pipe connected at one end to the meter outlet end of the outlet pipe, the other ends of the two riser pipes thereby positioned to receive a water meter and connecting components associated therewith.

9. A water meter setter as defined in claim 8 wherein the first set of riser pipes provides a two inch increase in rise above the meter inlet end and meter outlet end.

10. A water meter setter as defined in claim 8 wherein the first set of riser pipes provide a five inch increase in rise above the meter inlet end and meter outlet end.

11. A water meter setter as defined in claim 8 and further comprising a plurality of sets of two riser pipes, the riser pipes each having interior threads at one end thereof and exterior threads at the other end thereof, the sets of riser pipes respectively sequentially connected to the threaded meter inlet end of the inlet pipe and to the threaded meter outlet end of the outlet pipe.

12. A water meter setter is defined in claim 8 wherein each riser pipe has a cylindrical body, a smaller diameter stem extending from the body and having exterior threads on the distal end thereof, a bore extending through the stem and a portion of the body to a seat, the body defining interior threads below the seat for connecting the riser pipe to one of the continuous inlet and outlet pipes.

13. A water meter setter as defined in claim 1 wherein the central bracing structure includes at least two horizontal spaced-apart ribs connecting the continuous inlet pipe and the continuous outlet pipe, and a vertical rib connecting the horizontal ribs.

14. A water meter setter as defined in claim 1 wherein the integral metal casting is brass.

15. A unitary water meter setter comprising:
   A) a continuous inlet pipe having an inwardly extending inlet service leg with a threaded inlet service end, and an inlet meter support leg extending perpendicularly upwardly with respect to the inlet service leg, the inlet meter support leg having a vertically disposed threaded meter inlet end;
   B) a continuous outlet pipe having an inwardly extending outlet service leg substantially aligned with the inlet service leg of the inlet pipe and with a threaded outlet service end, and an outlet meter support leg extending perpendicularly upwardly with respect to the outlet service leg, the outlet meter support leg having a threaded meter outlet end; and
   C) a central bracing structure extending between the inlet pipe and the outlet pipe and rigidly connecting, spacing and positioning the inlet pipe such that the threaded meter inlet end of the inlet pipe and the threaded meter outlet end of the outlet pipe are positioned to receive a water meter and connecting components associated with a water meter for mounting the water meter on the meter setter.

16. A unitary water meter setter as defined in claim 15 wherein the inlet pipe, outlet pipe and central bracing structure are integrally cast brass metal.

17. A water meter setter as defined in claim 15 wherein the connecting components include first and second right angle fittings each having threaded couplers for respectively connecting the right angle fittings to the threaded meter inlet end of the inlet pipe and to the threaded meter outlet end of the outlet pipe, the right angle fittings supporting the water meter therebetween.

18. A water meter setter as defined in claim 17 wherein the connecting components include a first set of two riser pipes each providing substantially the same rise, one of the riser pipes threadably connected at one end thereof to the threaded meter inlet end of the inlet pipe and at the other end thereof to one of the right angle fittings, and the other riser pipe connected at one end thereof to the meter outlet end of the outlet pipe and at the other end thereof to the other right angle fitting.

19. A water meter setter as defined in claim 18 wherein the meter inlet end of the inlet pipe and the meter outlet end of the outlet pipe have exterior threads and the riser pipes each have interior threads at one end for connecting the riser pipe to one of the meter inlet end and meter outlet end and exterior threads at the other end for threadably receiving additional connecting components.

20. A water meter setter as defined in claim 19 wherein the first set of riser pipes provides a two inch increase in rise above the meter inlet end and meter outlet end.

* * * * *